United States Patent
Umezawa et al.

(10) Patent No.: US 9,509,896 B2
(45) Date of Patent: Nov. 29, 2016

(54) APPARATUS, IMAGING METHOD, AND FOCUS CONTROL APPARATUS TO CONTROL AUTOFOCUS BASED ON CONTRAST SIGNAL

(71) Applicant: Hitachi Industry & Control Solutions, Ltd., Hitachi-shi, Ibaraki (JP)

(72) Inventors: Iori Umezawa, Tokyo (JP); Tomoaki Nishiguchi, Tokyo (JP)

(73) Assignee: Hitachi Industry & Control Solutions, Ltd., Tokyo (JP)

( * ) Notice: Subject to any disclaimer, the term of this patent is extended or adjusted under 35 U.S.C. 154(b) by 26 days.

(21) Appl. No.: 14/598,670

(22) Filed: Jan. 16, 2015

(65) Prior Publication Data
US 2015/0207982 A1 Jul. 23, 2015

(30) Foreign Application Priority Data
Jan. 20, 2014 (JP) ................................. 2014-007424

(51) Int. Cl.
H04N 5/232 (2006.01)
H04N 5/14 (2006.01)
H04N 101/00 (2006.01)

(52) U.S. Cl.
CPC .......... *H04N 5/23212* (2013.01); *H04N 5/144* (2013.01); *H04N 5/145* (2013.01); *H04N 5/23254* (2013.01); *H04N 2101/00* (2013.01)

(58) Field of Classification Search
CPC ..................... H04N 5/23212; H04N 5/23254; H04N 5/144; H04N 5/145
See application file for complete search history.

(56) References Cited

U.S. PATENT DOCUMENTS

| | | | | |
|---|---|---|---|---|
| 2005/0270408 A1* | 12/2005 | Kwon | ................ | H04N 5/23212 348/345 |
| 2006/0192886 A1* | 8/2006 | Kobayashi | ......... | H04N 5/23212 348/345 |
| 2007/0196091 A1* | 8/2007 | Yamaguchi | ............ | G03B 13/36 396/95 |
| 2008/0049137 A1* | 2/2008 | Endo | .................. | H04N 5/23212 348/333.13 |
| 2009/0148146 A1* | 6/2009 | Maeda | ...................... | G02B 7/38 396/89 |
| 2010/0289940 A1* | 11/2010 | Toguchi | ............ | H04N 5/23212 348/345 |
| 2011/0273610 A1* | 11/2011 | Tay | ......................... | G06T 5/003 348/345 |
| 2013/0083232 A1* | 4/2013 | Tay | ......................... | H04N 5/232 348/357 |
| 2013/0120645 A1* | 5/2013 | Uenishi | .............. | H04N 5/23212 348/353 |
| 2013/0250162 A1* | 9/2013 | Sasaki | ...................... | G02B 7/30 348/345 |
| 2014/0267821 A1* | 9/2014 | Masuura | .................. | H04N 7/18 348/222.1 |
| 2015/0229831 A1* | 8/2015 | Miyazawa | ......... | H04N 5/23212 348/222.1 |
| 2016/0057338 A1* | 2/2016 | Chen | ........................ | G06K 9/40 348/345 |

FOREIGN PATENT DOCUMENTS

JP 2006-208818 A 8/2006
JP WO 2012081647 A1 * 6/2012 ............... G02B 7/30

* cited by examiner

*Primary Examiner* — Abdelaaziz Tissire
(74) *Attorney, Agent, or Firm* — Mattingly & Malur, PC (57) ABSTRACT

A change in a subject is quickly sensed and a focusing lens is driven with degradation in durability and out-of-focus states of output video images due to driving of the focusing lens more than necessary avoided. To achieve the object described above, the invention relates to an imaging apparatus that controls a focusing lens based on a contrast signal provided from a video signal and includes a controller that performs first evaluation based on comparison between the value of the contrast signal and the value of a main threshold, performs second evaluation after the first evaluation based on comparison between the value of the contrast signal and a sub-threshold that is greater or smaller than the main threshold and is set to decrease or increase with the lapse of time, and performs focus control on the focusing lens based on a result of the second evaluation.

14 Claims, 5 Drawing Sheets

APPARATUS, IMAGING METHOD, AND FOCUS CONTROL APPARATUS TO CONTROL AUTOFOCUS BASED ON CONTRAST SIGNAL

BACKGROUND

1. Technical Field

The present invention relates to an imaging apparatus, an imaging method, and a focus control apparatus.

2. Related Art

Many imaging apparatus of related art, such as a monitoring camera and a DVD (digital versatile disc) camera, have a built-in autofocus function that allows automatic focus adjustment. An example of a focusing method in an autofocus function of this type is a contrast-based focus adjustment method assuming that the amplitude of a contrast signal provided from captured video images is maximized when the images are brought into focus.

In an imaging apparatus, when, a focusing lens is moved along the optical axis thereof, captured video images are defocused or brought into focus and the amplitude of the contrast signal changes accordingly. Therefore, in a fundamental contrast-based method, the focusing lens is moved along the optical axis thereof, and a direction in which images are brought into focus is detected based on the magnitude of the amplitude of the contrast signal before and after the movement, followed by movement of the focusing lens in the detected direction to achieve an in-focus state.

In autofocus control, in which a focusing lens in a lens unit is moved along the optical axis thereof, performing unnecessary autofocus control excessively wears the lens unit and hence lowers the durability of the imaging apparatus.

For example, there is, for example, a situation in which a subject suddenly appears in front of a camera apparatus that has achieved an in-focus state of an image of another subject and the subject in front of the camera apparatus then instantly disappears from the screen of the camera apparatus. Also in this case, the camera apparatus determines that the another subject has changed and reactivates autofocus control, which means that unnecessary autofocus control is performed and the durability of the imaging apparatus is lowered. Further, since unnecessary focusing control is performed frequently, a risk of incorrect positioning of the focusing lens in positions shifted from a correct in-focus position increases. Moreover, when the focus control is continuously performed in response to a subject that suddenly appears in the screen of the camera apparatus, the focusing lens travels back and forth between the in-focus position and an out-of-focus position, resulting in continuous display of disordered video images. It is therefore necessary to prevent the durability of the imaging apparatus from being degraded by unnecessary autofocus reactivation and provide sharp video images.

An example of a background technology in the present technical field is JP-A-2006-208818. JP-A-2006-208818 describes "When a video camcorder that performs contrast-based autofocus control detects that an evaluation value used to detect an in-focus/out-of-focus state changes from a value representing an in-focus state by at least a threshold that serves as a guide for autofocus reactivation, the video camcorder is first put on standby until a standby period $T_W$ elapses. Ina case where the standby period $T_W$ elapses but the detected evaluation value remains unchanged without returning to a value smaller than the threshold, the autofocus control is reactivated. The video camcorder can thus be so operated that it does not respond when the evaluation value instantly changes by an amount greater than or equal to the threshold" (see Abstract). JP-A-2006-208818 therefore discloses a technology for evaluating whether such an out-of-focus state has occurred and activating autofocus control accordingly.

The method described in JP-A-2006-208818 uses the configuration in which the apparatus is put on standby for a fixed period and activates autofocus control only when the evaluation value changes by a fixed amount or smaller. However, even in a case where it is necessary to immediately reactivate autofocus control, it may also take time to perform the reactivation evaluation because the evaluation is performed after the apparatus is put on standby for the fixed period.

SUMMARY

The invention has been made in view of the points described above and provides an imaging apparatus, an imaging method, and a focus control apparatus that perform autofocus control but do not activate the autofocus control more than necessary.

To achieve the object described above, the invention relates to an imaging apparatus that controls a focusing lens based on a contrast signal provided from a video signal and includes a controller that performs first evaluation based on comparison between the value of the contrast signal and the value of a main threshold, performs second evaluation after the first evaluation based on comparison between the value of the contrast signal and a sub-threshold that is greater or smaller than the main threshold and is set to decrease or increase with the lapse of time, and performs focus control on the focusing lens based on a result of the second evaluation.

According to the invention, an imaging apparatus, an imaging method, and a focus control apparatus that perform autofocus control but do not activate the autofocus control more than necessary.

DESCRIPTION OF EXEMPLARY EMBODIMENTS

An example will be described below with reference to the drawings.

(1) Configuration of Imaging Apparatus According to Embodiment of Invention

Figure 1:
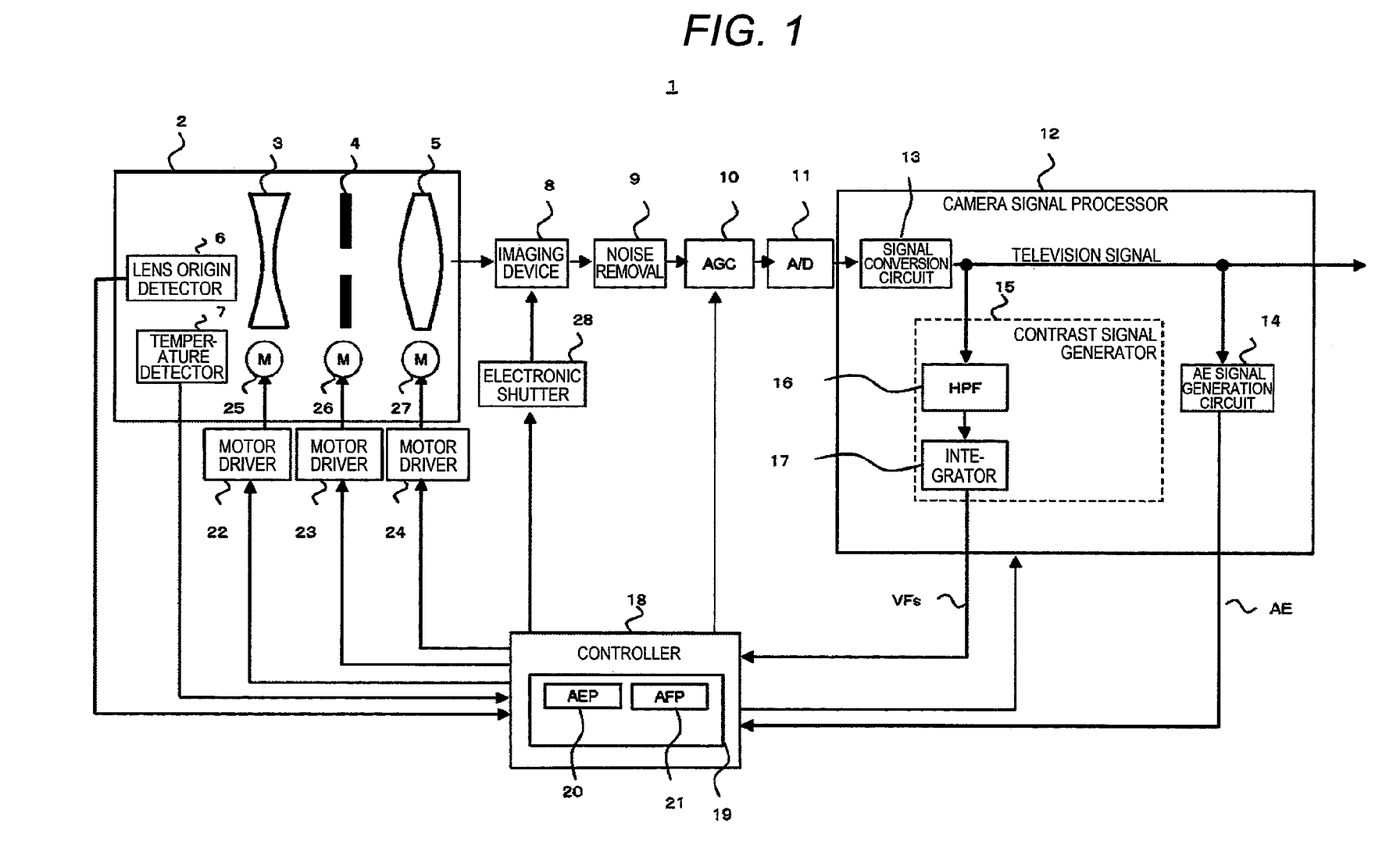
FIG. 1 is a block diagram showing an overall configuration of an imaging apparatus according to an embodiment of the invention.

FIG. 1 is a block diagram showing an overall configuration of an imaging apparatus 1 according to the present embodiment.

In the imaging apparatus 1, a lens unit 2 includes a variator lens group 3, which variably magnifies a light flux from a subject, an aperture 4, which adjusts the amount of received light, and a focusing lens group 5, which has a focus adjustment function.

The lens unit 2 is further provided with a lens origin detector 6, which is formed, for example, of a photointerrupter, and a temperature detector 7. The lens origin detector 6 detects absolute positions of the variator lens group 3 and the focusing lens group 5 and transmits results of the detection as lens absolute position information to a controller 18 or an external system capable of communicating with the imaging apparatus 1. The temperature detector 7 detects the temperature in the lens unit 2 and transmits a result of the detection as in-lens-unit temperature information to the controller 18 incorporated in the imaging apparatus 1 or an external system capable of communicating with the imaging apparatus 1. The lens unit 2 still further includes motors 25 to 27, which drive the variator lens group 3, the aperture 4, and the focusing lens group 5, respectively. The motors 25 to 27 can be driven based on motor control signals from motor drivers 22 to 24, respectively.

An imaging device 8 then forms an optical image of a subject on a light receiving surface of the imaging device 8, which is formed, for example, of a CCD. The optical image of the subject formed on the light receiving surface is photoelectrically converted, and the resultant captured image signal is outputted to a noise removal circuit 9. The noise removal circuit 9 performs predetermined noise removal on the captured image signal, and the processed signal is then outputted to an automatic gain control circuit (AGC: automatic gain controller) 10. The AGC 10 amplifies the captured image signal into a video signal having an optimum level, which is then outputted to an analog/digital conversion circuit (A/D) 11, where the video signal is converted into a digital signal, which is then outputted as a digital captured image signal to a camera signal processor 12.

The camera signal processor 12 includes a signal conversion circuit 13, an AE (automatic exposure) signal generation circuit 14, and a contrast signal generator 15. The signal conversion circuit 13 performs predetermined signal processing on the digital captured image signal inputted from the analog/digital conversion circuit (A/D) 11 to convert the digital captured image signal into a standard television signal that conforms to the NTSC (National Television Standards Committee) standard, the PAL (Phase Alternating Line) standard, or any other predetermined television scheme and outputs the converted signal to an external apparatus. Based on the inputted television signal, the AE signal generation circuit 14 generates an automatic iris signal AE having a signal level according, for example, to the brightness of current captured video images, the degree of opening of the aperture 4 in the lens unit 2, and the gain of the automatic gain control and outputs the automatic iris signal AE to the controller 18.

The contrast signal generator 15, which is provided in the camera signal processor 12, is formed of an HPF (highpass filter) circuit 16 and an integrator 17. The HPF circuit 16 is capable of arbitrarily changing a cutoff frequency, generates a contrast signal VF having a frequency higher than an arbitrary cutoff frequency, and outputs the contrast signal VF to the integrator 17. The integrator 17 integrates the inputted contrast signal VF and outputs a result of the integration to the controller 18. The contrast signal generator 15, which is formed of the HPF circuit 16 and the integrator 17, is capable of acquiring values within an arbitrary region of the television signal.

Figure 2:
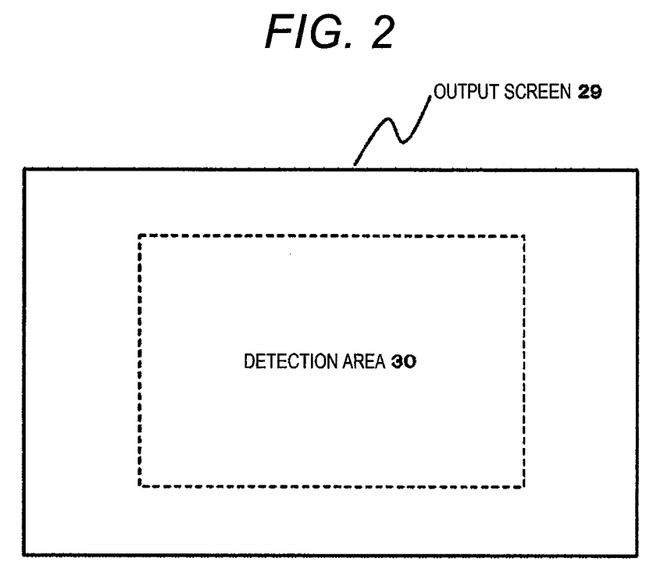
FIG. 2 shows a detection area in the present embodiment.

FIG. 2 shows a detection area in the present embodiment.

The contrast signal generator 15 may use a substantially central area of an output screen 29 as a detection area 30 as shown in FIG. 2 or, although not shown, may divide the output screen 29 into a plurality of areas and use each of the divided areas as the detection area 30.

Referring back to FIG. 1, the camera signal processor 12 extracts a high-frequency component of a luminance signal from a detection area, such as that shown in FIG. 2, out of the television signal generated by the signal conversion circuit 13 through the highpass filter circuit 16, performs integration in the integrator 17 on the extracted high-frequency component to generate a contrast signal VF, and transmits the contrast signal VF to the controller 18.

The controller 18 includes a CPU (central processing unit), an internal memory 19, and other information processing resources (neither of them is shown). The internal memory 18 stores an automatic iris data processor (AEP) 20 and an autofocus data processor (AFP) 21. The controller 18 determines the brightness of current captured video images based on the automatic iris signal AE and calculates an automatic iris evaluation value, which is an evaluation value associated with the degree of opening of the aperture 4, the gain of the automatic gain control, and other factors. The controller 18 also acquires an autofocus evaluation value, which is a value of the contrast signal VF.

The controller 18 further generates first and second motor control signals based on the automatic iris evaluation value, zoom magnification information representing the current zoom magnification obtained based on the lens absolute position information from the lens origin detector 6, the in-lens-unit temperature information provided from the temperature detector 7, and trace curve data stored in the internal memory 19 and outputs the first and second motor control signals to the motor driver circuits 22 and 23. The motor driver circuit 22 thus drives and controls the motor 25, which moves the variator lens group 3 in the lens unit 2 in the direction along the optical axis thereof, based on the inputted first motor control signal. Further, the motor driver circuit 23 drives and controls the second motor 26, which drives the aperture in the lens unit 2, based on the inputted second motor control signal. Automatic iris control is thus performed.

The controller 18 further controls the shutter speed of an electronic shutter 28 based on the automatic iris evaluation value to adjust the amount of light that forms an optical image of the subject formed on the light receiving surface of the imaging device 8. The controller 18 further performs gain adjustment in the automatic gain control circuit 10 based on the automatic iris evaluation value.

The controller 18 further detects an in-focus direction and an in-focus position based on the autofocus evaluation value, generates a third motor control signal, and sends the third motor control signal to the motor driver circuit 24. The motor driver circuit 24 thus drives and controls the motor 27, which moves the focusing lens group 5 in the lens unit 2 in the direction of the optical axis thereof, based on the third motor control signal. Autofocus control is thus performed, and an image of the subject to be captured can be brought into focus.

(2) Imaging Method According to Present Embodiment

Figure 3:
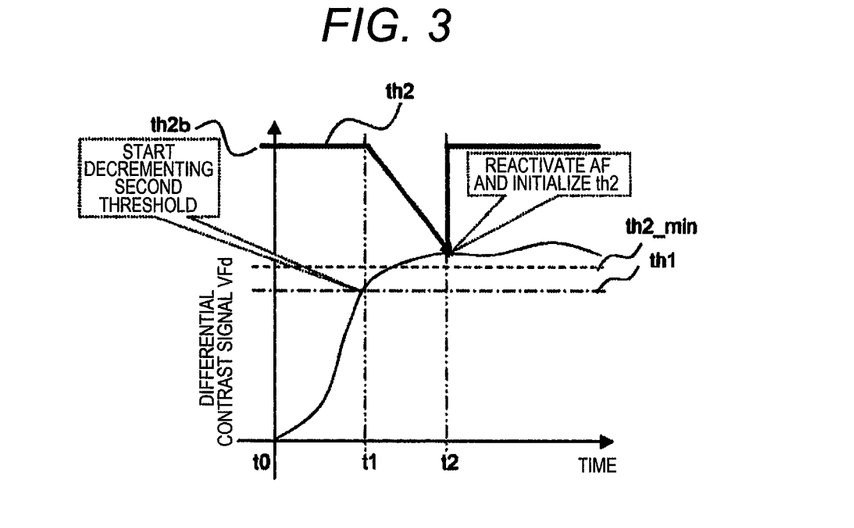
FIG. 3 shows an example of a change in a differential contrast signal value with the lapse of time.

FIG. 3 shows an example of a change in a differential contrast signal value VFd with the lapse of time in a case where a typical change in a subject occurs.

In FIG. 3, the differential contrast signal value VFd is the absolute value of the difference between a contrast signal VFp, which is the value of the contrast signal, which is acquired for each frame, at the time when the autofocus control is terminated, and a current contrast signal VFn (|VFn−VFp|).

Time t0 is a point of time after an in-focus state has been achieved once in the autofocus control and when the autofocus control operation is terminated. The value of the contrast signal when the autofocus control operation is terminated is stored as the autofocus evaluation value VFp in the internal memory 19.

During the autofocus control, when a subject or any other object appears in an imaging area after the time t0, when the autofocus control is terminated, the current contrast signal VFn changes. FIG. 3 shows that in the period from the time t0 to t1, the differential contrast signal value VFd increases, for example, because a new subject or any other object appears in the imaging area after an in-focus state is achieved.

The autofocus control in the present example will be described below.

In the present example, it is first evaluated whether the current contrast signal VFn has changed from the autofocus evaluation value VFp by at least a fixed amount. That is, it is evaluated whether or not the differential contrast signal value VFd, which is the absolute value of the difference between the autofocus evaluation value VFp and the value of the current contrast signal VFn, has become greater than or equal to a first threshold th1 set in the internal memory 19 in advance (|VFn−VFp|≥th1). FIG. 3 shows that after the time t1, the differential contrast signal value VFd becomes greater than or equal to the first threshold th1.

In the autofocus control of the related art, the autofocus control is reactivated after an arbitrary fixed standby period elapses but only when the contrast signal VF (or differential contrast signal value VFd) continues to have at least a fixed magnitude for the fixed standby period from the time t1. That is, since the fixed standby period set in advance needs to elapse before the evaluation, it is believed that it takes time to perform the evaluation.

On the other hand, the present embodiment is characterized in that a second threshold th2 is employed, and the second threshold th2 has an initial value th2b of the second threshold, which is an initial value, at the time t1. The initial value th2b of the second threshold may be generated at an arbitrary point of time before or after the time t1. The initial value th2b of the second threshold is greater than the first threshold th1, and the second threshold decreases with the lapse of time from the initial value th2b of the second threshold. It is, however, noted that the second threshold is so decremented that it does not become smaller than a minimum th2_min of the second threshold. FIG. 3 shows that after the time t1, the current contrast signal VFn changes in an upward tendency, and at time t2, the differential contrast signal value VFd (|VFn−VFp|) becomes greater than or equal to the second threshold th2 (|VFn−VFp|≥th2).

Figure 4:
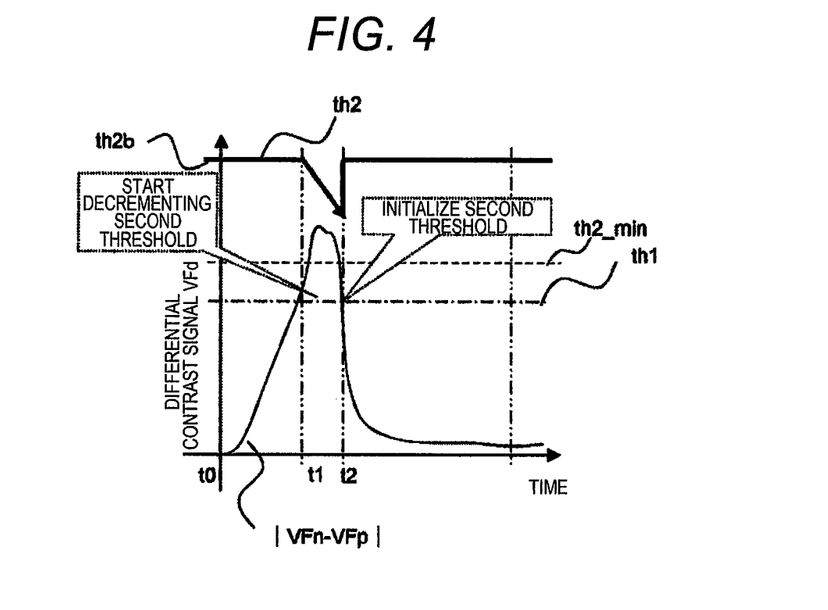
FIG. 4 shows an example of a change in the differential contrast signal value with the lapse of time in a case where a subject appears in a detection frame after autofocus operation is terminated and the subject then instantly disappears from the detection frame.
Figure 5:
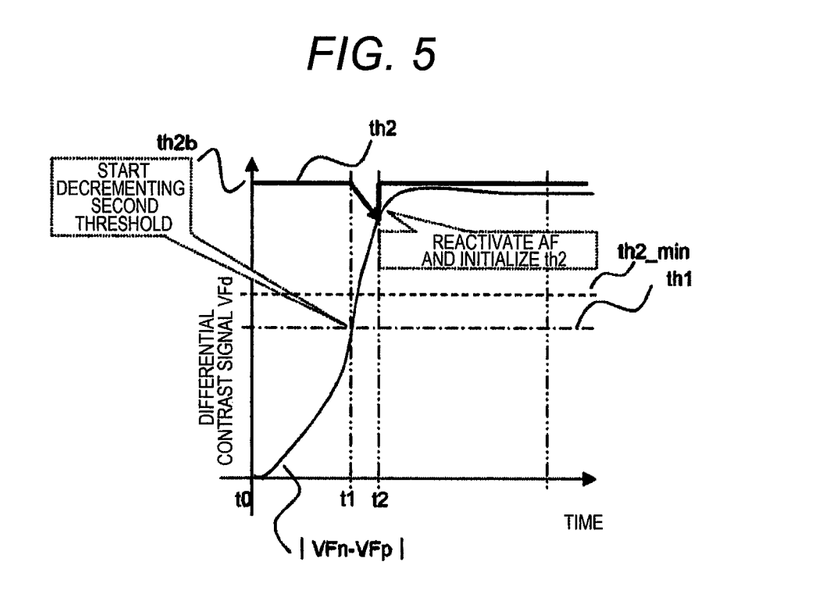
FIG. 5 shows an example of a change in the differential contrast signal value with the lapse of time in a case where a subject changes with a large change in a contrast signal.

At this point, the autofocus control is reactivated and the second threshold th2 is set back at the initial value th2b of the second threshold. The second threshold th2 may instead be set back at the initial value th2b of the second threshold when the differential contrast signal value VFd becomes lower than the first threshold th1. The initialization of the second threshold may be performed or the second threshold may be set back at the initial value th2b of the second threshold after the second threshold th2 is decremented and when the second threshold th2 reaches the minimum th2_min of the second threshold, or the initialization may be performed at an arbitrary point of time. Employing the second threshold described above allows quicker reactivation of the autofocus control than in the related art when the reactivation is essentially required but prevents the reactivation when the reactivation is not essentially required but a subject instantly appears in the output screen. FIGS. 4 and 5 below show examples of a change in the differential contrast signal value VFd, and the advantageous effect described above is enhanced in the figures.

FIG. 4 shows an example of a change in the differential contrast signal value VFd with the lapse of time in a case where a subject appears in the detection frame after the autofocus operation is terminated and the subject then instantly disappears from the detection frame.

In FIG. 4, it is first evaluated whether the current contrast signal VFn has changed from the autofocus evaluation value VFp by at least a fixed amount. That is, it is evaluated whether or not the differential contrast signal value VFd, which is the absolute value of the difference between the autofocus evaluation value VFp and the current contrast signal VFn, is greater than or equal to the first threshold th1 set in advance in the internal memory 19 (|VFn−VFp|≥th1). FIG. 4 shows that after the time t1, the differential contrast signal value VFd becomes greater or equal to the first threshold th1. After the time t1, the current contrast signal VFn changes in an upward tendency, but the differential contrast signal value VFd (|VFn−VFp|) does not become greater than or equal to the second threshold th2 but becomes smaller than or equal to the first threshold th1. Therefore, the autofocus control is not reactivated, and the second threshold th2 is set back at the initial value th2b of the second threshold at the time t2. In the above description, the initialization of the second threshold is performed when the differential contrast signal value VFd becomes smaller than the first threshold th1, but the second threshold may be set back at the initial value th2b of the second threshold after the second threshold th2 is decremented and when the second threshold th2 reaches the minimum th2_min of the second threshold, or the initialization may be performed at an arbitrary point of time.

In the example shown in FIG. 4 described above, using the approach of the present embodiment, in which the differential contrast signal value VFd becomes greater than or equal to the first threshold th1 but the second threshold that decreases with the lapse of time is employed in the present example, can prevent unnecessary autofocus reactivation based on an instant increase in the contrast signal in a case where the reactivation is not essentially required but a subject instantly appears in the output screen. On the other hand, if the second threshold is set, for example, at a fixed value, the evaluation of the reactivation is performed based on the second threshold th2 when the contrast signal instantly increases. In this case, the advantageous effect of preventing unnecessary reactivation cannot be provided.

The second threshold th2 has been presented by way of example as a value that monotonously decreases with the lapse of time from the initial value th2b at the time t1, but the second threshold th2 does not necessarily monotonously decrease and only needs to change in a downward tendency with the lapse of time.

FIG. 5 shows an example of a change in the differential contrast signal value VFd with the lapse of time in a case where a subject changes with a large change in the contrast signal.

As in FIG. 3 shown above, the differential contrast signal value VFd becomes greater than the first threshold th1 at the time t1 and becomes greater than the second threshold th2 at the time t2, and the autofocus control is reactivated.

FIG. 5, in which the contrast signal changes more greatly than in FIG. 3, shows that the difference between the time t2 and the time t1 in FIG. 5 is smaller than the difference between the time 2 and the time t1 in FIG. 3. That is, in the present example, the autofocus control can be reactivated more quickly in a case where a subject that requires autofocus reactivation is involved and the value of the contrast signal changes by a larger amount.

On the other hand, instead of the differential contrast signal value VFd, the evaluation can be performed based on the value of the current contrast signal VFn.

Figure 6:
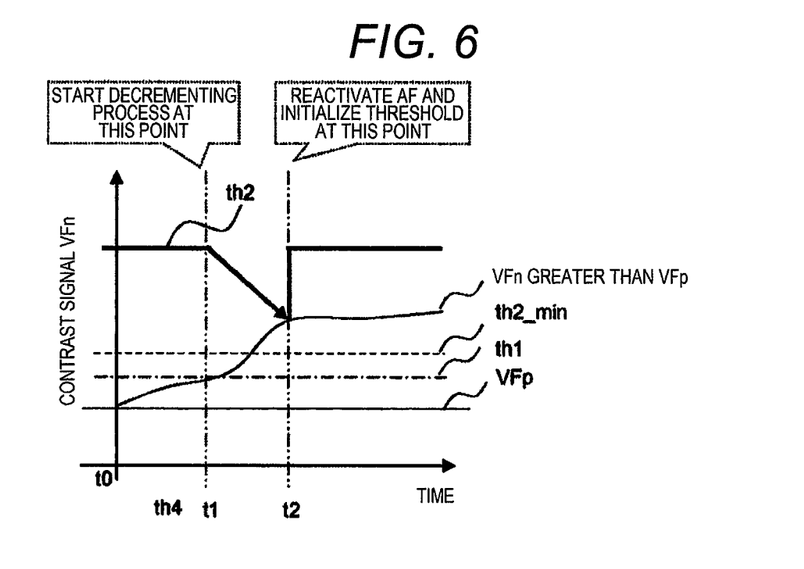
FIG. 6 shows an example of a change in the current contrast signal with the lapse of time in a case where the current contrast signal is greater than an autofocus evaluation value in the present embodiment.
Figure 7:
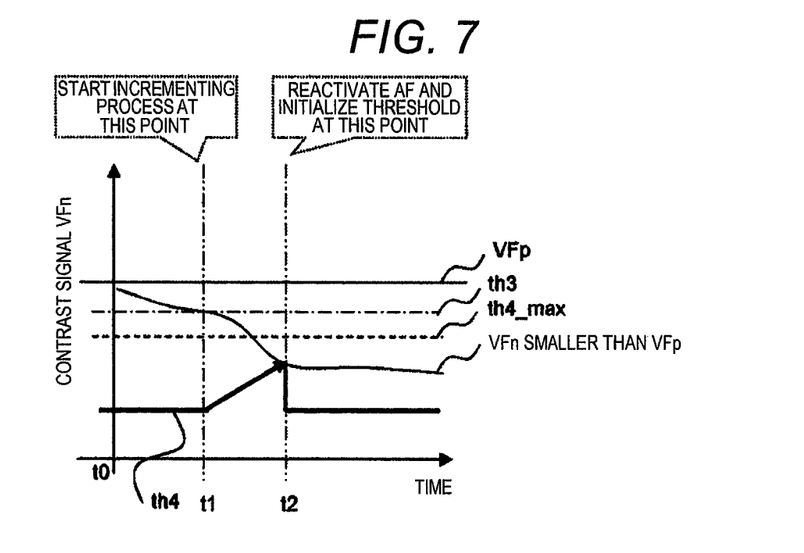
FIG. 7 shows an example of a change in the current contrast signal with the lapse of time in a case where the current contrast signal is smaller than the autofocus evaluation value in the present embodiment.

In this case, assuming that the current contrast signal VFn is greater than the autofocus evaluation value VFp, when the current contrast signal VFn becomes greater than the first threshold th1, which is set at a value greater than VFp, and then becomes greater than the second threshold th2, which decreases with the lapse of time from the point of time when the current contrast signal VFn becomes greater than the first threshold th1, the autofocus control is reactivated (FIG. 6). On the other hand, assuming that the current contrast signal VFn is smaller than the autofocus evaluation value VFp, a different process needs to be carried out. For example, a third threshold th3 smaller than the autofocus evaluation value VFp is set, and when the current contrast signal VFn becomes smaller than the third threshold th3 and then becomes smaller than a fourth threshold th4, which has an initial value smaller than the third threshold th3 and increases with the lapse of time from the point of time when the current contrast signal VFn becomes smaller than the third threshold th3, the autofocus control is reactivated. At this point, the fourth threshold th4 increases in such a way that it does not become greater than a maximum th4_max of the fourth threshold (FIG. 7).

It is, however, expected that using the differential contrast signal value VFd in the evaluation reduces the processing burden as compared with the case where the current contrast signal VFn is used in the evaluation.

Each of the first and third thresholds is a threshold to be compared with the value of the contrast signal in terms of magnitude and is referred to as a main threshold in the present specification and other documents. The second threshold is a threshold so set that it is greater than the first threshold and decreases with the lapse of time. Further, the fourth threshold is a threshold so set that it is smaller than the third threshold and increases with the lapse of time. Each of the second and fourth thresholds is referred to as a sub-threshold in the present specification and other documents.

Figure 8:
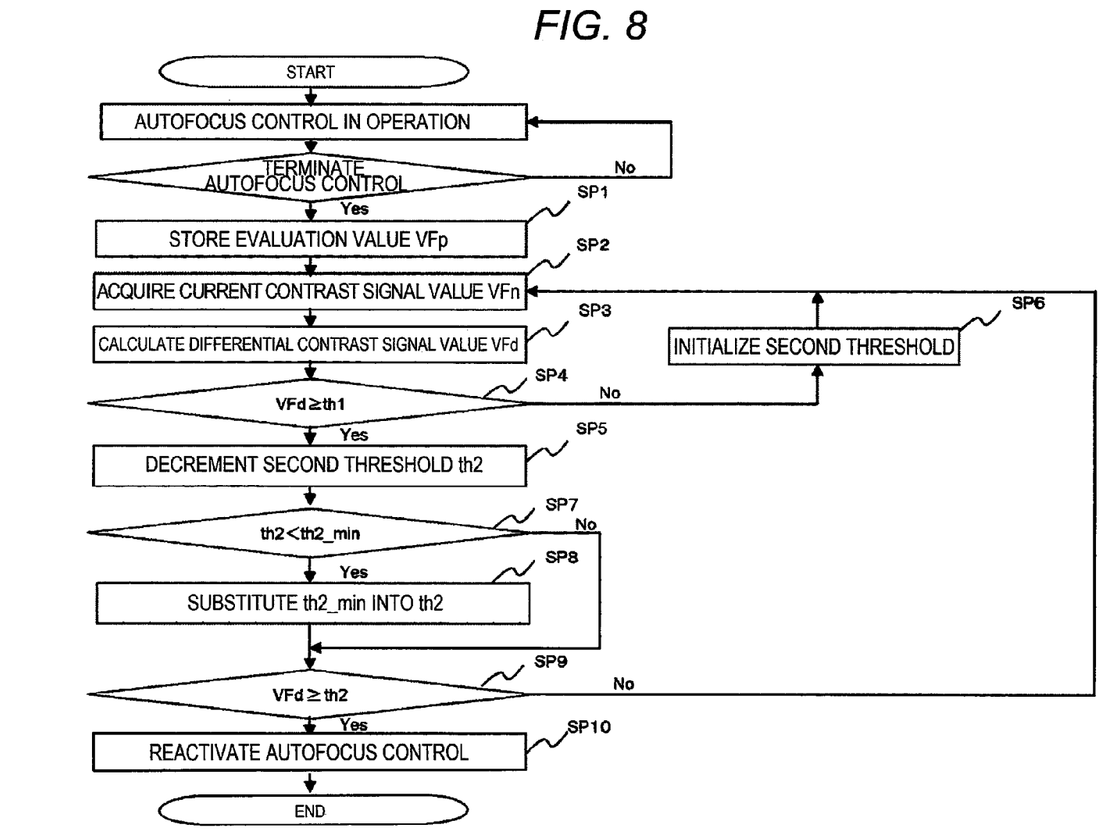
FIG. 8 is a flowchart of an autofocus control reactivation process in an example of the invention.

FIG. 8 is a flowchart of the autofocus reactivation process in the present example.

In the description below, the evaluation is performed by way of example based on the differential contrast signal value VFd, the first threshold th1, which is one of the main thresholds, and the second threshold th2, which is one of the sub-thresholds. The same process flowchart is employed also in the evaluation based on the current contrast signal VFn described above. The processes shown in FIG. 8 form a process sequence achieved when the controller 18 executes a program stored in the internal memory 19 in the imaging apparatus 1.

First, the autofocus evaluation value VFp, which is the value of the contrast signal provided from the contrast signal generator 15 after contrast-based autofocus control is terminated, is stored in the internal memory 19 (SP1).

The controller 18 then acquires the evaluation value VFn, which is the value of the contrast signal provided from the contrast signal generator 15 during a period in which imaging continues, for each frame (SP2).

The controller 18 then calculates the absolute value |VFn−VFp|, which is the difference between the autofocus evaluation value VFp and the evaluation value VFn described above, as the differential contrast signal value VFd (SP3).

The controller 18 further evaluates whether the differential contrast signal value VFd is greater than or equal to the first threshold th1 (VFd≥th1) (SP4).

When the differential contrast signal value VFd is greater than or equal to the first threshold th1 (VFd≥th1) (Yes in SP4), the second threshold th2 is so decremented that it changes from the initial value th2b of the second threshold in a downward tendency (SP5).

On the other hand, when the differential contrast signal value VFd is smaller than the first threshold th1 (VFd<th1) (No in SP4), the second threshold is set back at the initial value th2b of the second threshold (SP6).

The second threshold has the minimum th2_min of the second threshold. When the absolute value |VFn−VFp| is greater than or equal to the first threshold th1, the second threshold th2 is decremented whenever a unit period elapses in such away that the second threshold th2 does not become smaller than the minimum th2_min of the second threshold. Specifically, it is evaluated whether or not the second threshold th2 is greater than the minimum th2_min of the second threshold (SP7). When the second threshold th2 is smaller than the minimum th2_min of the second threshold (Yes in SP7), the control proceeds to SP8. On the other hand, when the second threshold th2 is greater than the minimum th2_min of the second threshold (No in SP7), the control proceeds to SP9.

In SP8, the minimum th2_min of the second threshold is substituted into the second threshold th2. The process in SP8 prevents the second threshold th2 from becoming smaller than the minimum th2_min of the second threshold.

It is then evaluated whether the differential contrast signal value VFd is greater than or equal to the second threshold the (VFd≥th2) (SP9).

When the evaluation result in SP9 is that the differential contrast signal value VFd is greater than or equal to the second threshold th2 (Yes in SP9), the autofocus control is reactivated (SP10).

On the other hand, when the differential contrast signal value VFd is smaller than the second threshold th2 (No in SP9), the autofocus control is not reactivated and the control returns to SP2.

The first threshold th1 and the initial value th2b of the second threshold can be arbitrarily set in accordance with the type of imaging apparatus. It is noted that setting each of them at a greater value can make it more difficult to reactivate the autofocus control even when the contrast signal changes by a larger amount. That is the evaluation of whether the autofocus function is reactivated can be made less sensitive to a change in a subject. Conversely, setting the first threshold th1 or the initial value th2b of the second threshold at a small value allows improvement in the sensitivity of the evaluation of whether the autofocus function is reactivated.

Further, how to decrement the second threshold th2 can also be arbitrarily determined in accordance with the type of imaging apparatus. Setting the decrement per unit time at a greater value allows the differential contrast signal value VFd, after it becomes greater than the first threshold th1, to become greater than the second threshold th2 more quicker, whereby the autofocus function can be reactivated more quicker. On the other hand, setting the decrement at a smaller value causes the autofocus function to be reactivated more slower.

Each of the first threshold th1, the second threshold th2, the initial value th2b of the second threshold, and the minimum th2_min of the second threshold may be an arbitrary value. It is, however, effective to set each of them, for example, to be a fixed proportion of the autofocus evaluation value VFp. The reason for this is that since the tendencies of the autofocus evaluation value VFp and the current contrast signal VFn change in accordance with an environment around a subject, setting each of the thresholds to be a proportion of the autofocus evaluation value VFp allows the autofocus control to readily follow a change in the environment. For example, when each of the thresholds is so set in the form of an absolute value that the autofocus function can be appropriately reactivated in a bright environment, the threshold thus set in the form of an absolute value does not allow appropriate autofocus reactivation in a dim environment because the contrast signal changes by a small amount in a dim environment. Conversely, when each of the thresholds is so set in the form of an absolute value that the autofocus function can be appropriately reactivated in a dim environment, the autofocus function is possibly reactivated in response to a slight change in a subject because the contrast signal changes by a large amount in a bright environment. Setting each of the thresholds in the form of proportion as described above can avoid the phenomenon described above and achieve more appropriate evaluation of the autofocus reactivation.

As described above, employing the configuration of the present example prevents unnecessary autofocus reactivation in a case where a subject that does not essentially require the autofocus reactivation appears in the detection area 30, whereby the focusing lens is not moved more than necessary. Therefore, mechanical degradation, wear, and other disadvantageous effects can be suppressed, and disordered video images due to excessively frequent movement of the focusing lens can be avoided. That is, degradation in durability and out-of-focus states of output video images due to driving of the focusing lens more than necessary can be avoided.

On the other hand, when a subject that essentially requires autofocus reactivation appears in the detection area 30, the reactivation evaluation based on a change in the contrast signal along with the main thresholds and the sub-thresholds described above allows the autofocus control to be reactivated more quicker than in the related art in a case where the reactivation is essentially required. Further, changing each of the thresholds and the decrements in accordance with the type of subject allows further improvement in the advantageous effect described above.

As described above, according to the present example, the reliability and durability of the imaging apparatus can be improved.

(3) Other Embodiments

The above embodiment has been described with reference to the case where the invention is applied to the imaging apparatus configured as shown in FIG. 1, but the invention is not necessarily configured this way. The invention is widely applicable to imaging apparatus having a variety of other configurations.

In the embodiment described above, the contrast signal is temporarily stored as the autofocus evaluation value when the autofocus control is terminated, but the contrast signal is not necessarily stored when the autofocus control is terminated. The contrast signal may be stored at any point of time to the extent that the evaluation is performed under a condition that changes in a subject and an environment around the subject from an arbitrary point of time are used as indices in the evaluation. That is, when it is desired to activate the autofocus control based on a change in the autofocus evaluation value from an arbitrary point of time, the contrast signal or any other autofocus evaluation value at the arbitrary point of time is acquired, and the autofocus control can then be activated in accordance with the procedure according to the embodiment of the invention. This configuration is suitable for a case where although the autofocus control is not in operation, the contrast signal changes, for example, after open/close operation of the aperture greatly changes the amount of light exposure in the light exposure control in the imaging apparatus.

The above embodiment has been described with reference to the case where in the process of decrementing each of the sub-thresholds by a fixed amount, the decrement is fixed, but the invention is not necessarily configured this way. Instead, it is, for example, conceivable that the decrement is increased with time. That is, after the contrast signal becomes greater than the main threshold, the sub-threshold may be so decremented that the autofocus control does not respond to an instant change in the contrast signal resulting from a change in a subject but is reactivated, for example, when the subject is intentionally changed. This configuration allows the reactivation evaluation to be performed more quickly.

Further, in the embodiment described above, the contrast signal is also used as the autofocus evaluation value. Instead, the evaluation of the autofocus reactivation can be performed based on a luminance intensity. In this case, a luminance intensity Bp after the autofocus control is terminated is temporality saved in the internal memory 19. Thereafter, when the absolute value |Bn−Bp| of the difference between the luminance intensity Bp and a current luminance intensity Bn becomes greater than a first threshold th1', a second threshold th2' is decremented, and when the absolute value |Bn−Bp| becomes greater than the second threshold at a certain point of time, the autofocus control may be activated.

In the present specification, the first threshold th1' is referred to as the main threshold, and the second threshold th2' is referred to as the sub-threshold.

What is claimed is:

1. An imaging apparatus that controls a focusing lens based on a contrast signal provided from a video signal, the apparatus comprising:
    a controller that performs first evaluation based on comparison between the value of the contrast signal and the value of a main threshold, performs second evaluation after the first evaluation based on comparison between the value of the contrast signal and a sub-threshold that is greater or smaller than the main threshold and is set to decrease or increase with the lapse of time, and performs focus control on the focusing lens based on a result of the second evaluation;

wherein the sub-threshold is set to decrease with the lapse of time when the sub-threshold is greater than the main threshold and is set to increase with the lapse of time when the sub-threshold is smaller than the main threshold.

2. The imaging apparatus according to claim 1, wherein when the value of the contrast signal is a differential contrast signal value that is the absolute value of the difference between an arbitrary value of the contrast signal and the value of the contrast signal at an arbitrary point of time in the evaluation, the sub-threshold is a value greater than the value of the contrast signal and the main threshold, and when the differential contrast signal value becomes greater than or equal to the main threshold in the first evaluation, the differential contrast signal value is compared with the sub-threshold in the second evaluation, and when the differential contrast signal value becomes greater than or equal to the sub-threshold in the second evaluation, the controller performs the focus control on the focusing lens.

3. The imaging apparatus according to claim 2, wherein the arbitrary value of the contrast signal is the value of the contrast signal in a state in which the focusing lens is in an in-focus position.

4. The imaging apparatus according to any of claims 1 to 3, wherein the first or second evaluation is performed based on a luminance intensity instead of the contrast signal.

5. The imaging apparatus according to any of claims 1 to 3, wherein an amount of increase in the sub-threshold, when the sub-threshold is smaller than the main threshold, increases with the lapse of time; and wherein an amount of decrease in the sub-threshold, when the sub-threshold is greater than the main threshold, increases with the lapse of time.

6. The imaging apparatus according to any of claims 1 to 3, wherein the focus control performed on the focusing lens based on a result of the second evaluation is reactivation of autofocus control of the focusing lens.

7. An imaging method for controlling a focusing lens based on a contrast signal provided from a video signal, the method comprising:

performing first evaluation based on comparison between the value of the contrast signal and the value of a main threshold, performing second evaluation after the first evaluation based on comparison between the value of the contrast signal and a sub-threshold that is greater or smaller than the main threshold and is set to decrease or increase with the lapse of time, and performing focus control on the focusing lens based on a result of the second evaluation;

wherein the sub-threshold is set to decrease with the lapse of time when the sub-threshold is greater than the main threshold and is set to increase with the lapse of time when the sub-threshold is smaller than the main threshold.

8. The imaging method according to claim 7, wherein an amount of increase in the sub-threshold, when the sub-threshold is smaller than the main threshold, increases with the lapse of time; and wherein an amount of decrease in the sub-threshold, when the sub-threshold is greater than the main threshold, increases with the lapse of time.

9. The imaging method according to claim 7, wherein the first or second evaluation is performed based on a luminance intensity instead of the contrast signal.

10. The imaging method according to claim 7, wherein the focus control performed on the focusing lens based on a result of the second evaluation is reactivation of autofocus control of the focusing lens.

11. A focus control apparatus that controls a focusing lens based on a contrast signal provided from a video signal, the apparatus comprising:

a controller that performs first evaluation based on comparison between the value of the contrast signal and the value of a main threshold, performs second evaluation after the first evaluation based on comparison between the value of the contrast signal and a sub-threshold that is greater or smaller than the main threshold and is set to decrease or increase with the lapse of time, and performs focus control on the focusing lens based on a result of the second evaluation;

wherein the sub-threshold is set to decrease with the lapse of time when the sub-threshold is greater than the main threshold and is set to increase with the lapse of time when the sub-threshold is smaller than the main threshold.

12. The focus control apparatus according to claim 11, wherein an amount of increase in the sub-threshold, when the sub-threshold is smaller than the main threshold, increases with the lapse of time; and wherein an amount of decrease in the sub-threshold, when the sub-threshold is greater than the main threshold, increases with the lapse of time.

13. The focus control apparatus according to claim 11, wherein the first or second evaluation is performed based on a luminance intensity instead of the contrast signal.

14. The focus control apparatus according to claim 11, wherein the focus control performed on the focusing lens based on a result of the second evaluation is reactivation of autofocus control of the focusing lens.

* * * * *